Patented May 19, 1953

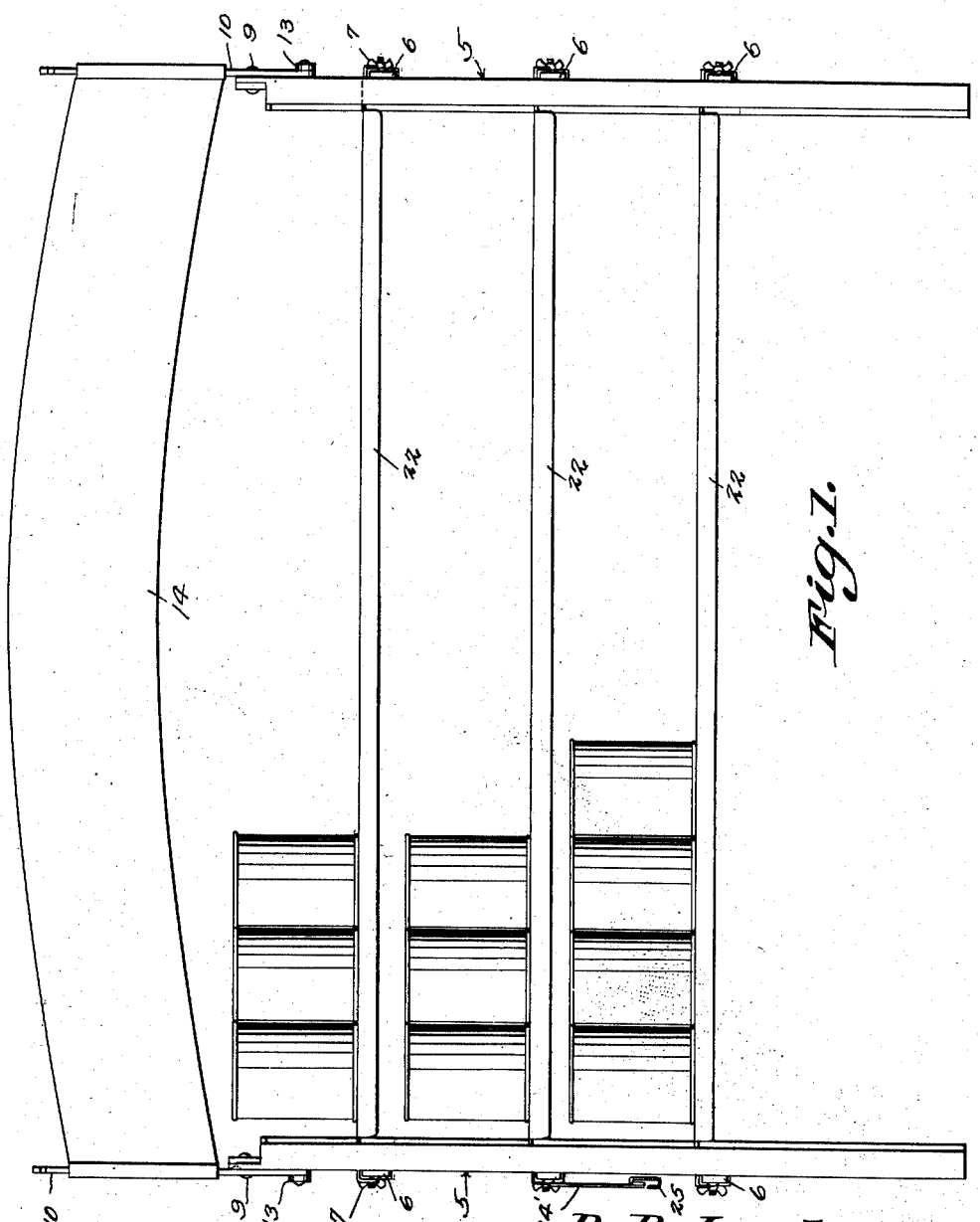

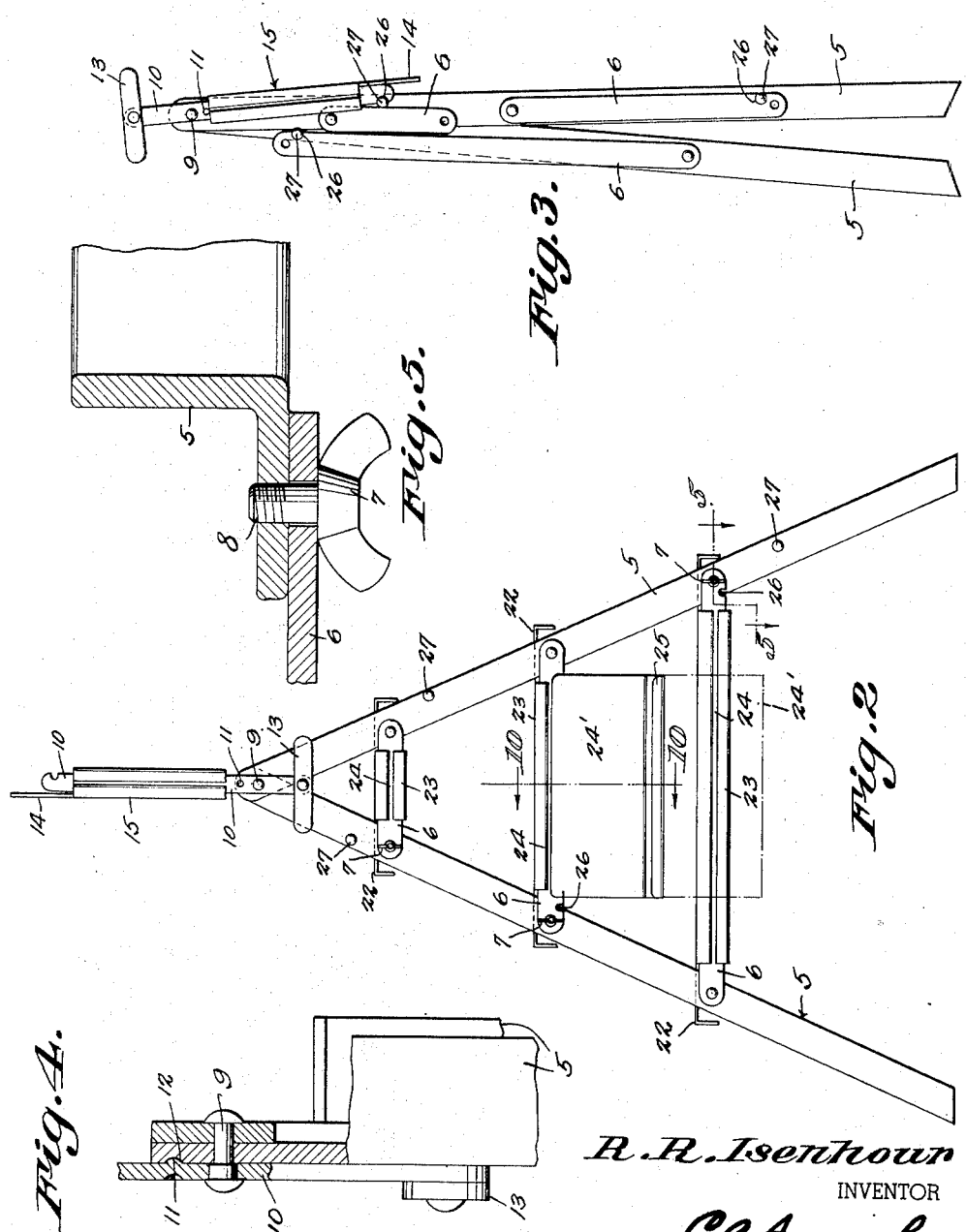

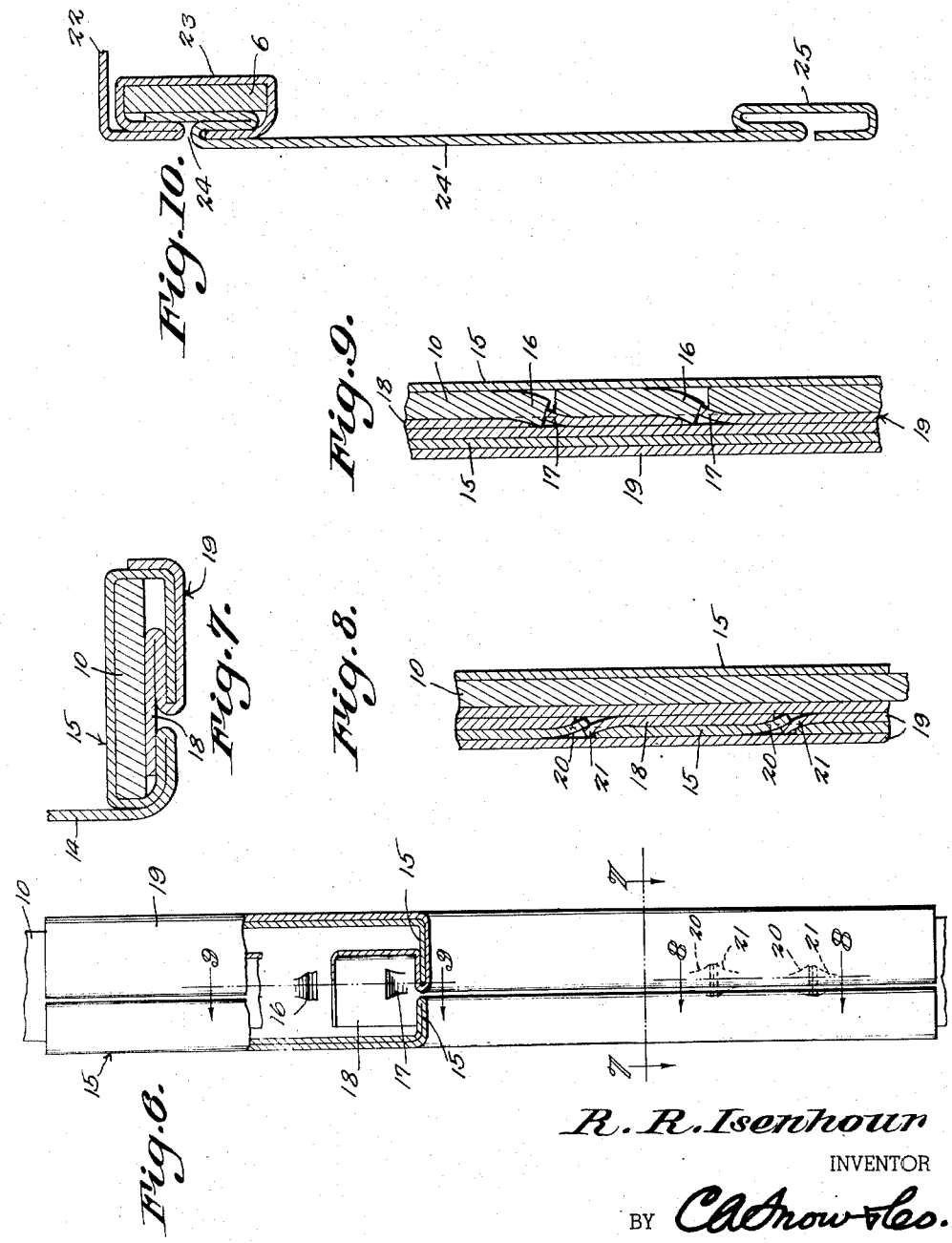

2,638,692

UNITED STATES PATENT OFFICE 2,638,692

COMMODITY DISPLAY RACK

Russell R. Isenhour, Geneva, N. Y.

Application December 12, 1947, Serial No. 791,258

1 Claim. (Cl. 40—125)

This invention relates to commodity racks designed primarily for use in supporting and displaying cans of lubricating oil at service stations.

An important object of the invention is to provide a rack of this character, which is so constructed that it cannot be used by unauthorized persons without detection.

A further object of the invention is to provide a rack having an identification plate secured along the top thereof, which plate can only be removed and the rack converted for use other than the use for which the rack has been originally designed, by mutilating the plate or rack to a point to attract attention and indicate theft.

A still further object of the invention is to provide a collapsible rack which may be folded into a small and compact article to facilitate the shipping and storing of the rack.

Still another object of the invention is to provide a rack with removable and interlocking and advertising plates disposed at the end thereof, whereby the advertising medium may be varied to meet the requirements of use.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a front elevational view of a rack constructed in accordance with the invention.

Fig. 2 is an end elevational view thereof.

Fig. 3 is an end elevational view of the rack in its folded condition.

Fig. 4 is a fragmental elevational view partly in section, illustrating the connection between the pivoted legs forming the end members of the rack.

Fig. 5 is a sectional view taken on line 5—5 of Fig. 2.

Fig. 6 is an elevational view partly in section, illustrating the means for locking the identification plates to the stand.

Fig. 7 is a sectional view taken on line 7—7 of Fig. 6.

Fig. 8 is a sectional view taken on line 8—8 of Fig. 6.

Fig. 9 is a sectional view taken on line 9—9 of Fig. 6.

Fig. 10 is a sectional view taken on line 10—10 of Fig. 2.

Referring to the drawings in detail, the rack comprises identical end members 5, each end member comprising pivotally connected legs formed of lengths of angle bar material, the open sides thereof being disposed inwardly presenting smooth outer surfaces to which the pivoted bars 6 are connected, the bars 6 being of various lengths to spread the bars of the end members in a manner as shown by Fig. 2 of the drawings. One end of each of the pivoted bars 6 is removably secured to one of the legs of the end member of which it forms a part, and is held in position by means of the wing nut 7 that is secured on the threaded end of the bolt 8 that extends through the end member and pivoted bar. The opposite ends of the bars 6 are pivotally connected to one of the legs of the end member so that these pivoted bars are securely held to the leg members at all times. As shown, portions of the flanges of the angle bars of which the end members are constructed, are cut away and formed with openings through which the rivets 9 extend, the rivets 9 constituting the pivot between the angle bars of the end members and at the same time providing means for securing the pivoted bars 10 to the upper ends of the end members. These bars 10 are formed with lugs 11 that fit into recesses 12 formed on the end members, the lugs snapping into position as the bars 10 are swung upwardly, thereby holding the bars 10 in vertical positions under normal conditions. Cross arms 13 are secured to the lower ends of the bars 10 and provide handles by means of which the rack may be carried.

The reference character 14 indicates the identification plate of the rack, the plate being supplied with suitable lettering, preferably indicating the brand of oil contained in the cans displayed, and the name of the owner of the service station, where the commodity is sold. The identification plate 14 has its ends bent upon itself to provide tubular end portions, the bars 10 being provided with downwardly and inwardly extended ears 16 that cooperate with upwardly and outwardly extended ears 17 formed on the inner section 18 of the locking bars 19.

The tubular end portions 15 are also provided with downwardly and inwardly extended ears 20 that cooperate with upwardly and outwardly extended ears 21 formed on the locking bar 19, below the ears 17. Thus it will be seen that due to this construction when the tubular end portions of the identification plate are positioned over the bars 10 and the locking bars 19 forced between the tubular end portions and bars 10, the cooperating ears will interengage in such a way as to prevent the identification plate from being pulled upwardly and being removed without mutilating or cutting the tubular end portions, which would, of course, render them conspicuous, indicating theft.

The shelves which connect the end members of the rack, are indicated by the reference character 22, each shelf being provided with a substantially tubular end 23, the tubular ends 23 of the shelves being slightly flattened so that they will closely fit over the pivoted bars 6, the bars 6 being forced into the tubular ends where they remain secured to the bars.

In forming the tubular ends 23, the sheet material of which the shelves are formed, is bent upon itself in such a way as to provide an elongated opening indicated at 24, the elongated opening permitting of attachment of a removable plate 24' thereto, the removable plate having a downwardly extended end fitted within the elongated opening.

In forming the removable plates 24', the removable plates have tubular ends 25 in which the hooks of adjacent removable plates may be interlocked, thereby removably securing the removable plates in position, permitting of ready interchanging of the plates.

It might be further stated that certain of the bars 6 are formed with notches 26 that fit over the pins 27, securing the legs of the end bars together, when the device is folded.

From the foregoing it will be seen that due to the construction shown and described, I have provided a rack for supporting and displaying cans of lubricating oil or similar commodities, so that the attendants of a service station will have easy access thereto, and the commodity will be displayed to an advantage.

It will further be seen that because of the manner of securing the identification plate to the rack, it would be impossible for the identification plate to be removed by unauthorized persons without multilating the rack to a degree to indicate theft or unauthorized use.

Having thus described the invention, what is claimed is:

A commodity display rack comprising a frame including end members, vertically swinging bars pivotally connected with the frame rising from the end members, an identification plate having its ends bent inwardly providing tubular end portions fitted over the vertically swinging bars, downwardly disposed tongues punched outwardly from the end bars, tongues punched outwardly from the walls of the tubular end portions and disposed upwardly, the extreme ends of the downwardly disposed tongues of the vertically swinging bars abutting the extreme ends of the upwardly disposed tongues of the tubular end portions preventing upward movement of said plate on the end members, and portions of the walls of the tubular end portions overlying said tongues guarding said tongues.

RUSSELL R. ISENHOUR.

References Cited in the file of this patent

UNITED STATES PATENTS

| Number | Name | Date |
|---|---|---|
| 466,926 | Bartlett | Jan. 12, 1892 |
| 614,432 | Austin | Nov. 22, 1898 |
| 648,402 | Haarmann et al. | May 1, 1900 |
| 657,661 | Kinnear | Sept. 11, 1900 |
| 839,501 | Munro | Dec. 25, 1906 |
| 914,685 | Waters | Mar. 9, 1909 |
| 1,040,270 | Bryning | Oct. 8, 1912 |
| 1,629,229 | Sharp | May 17, 1927 |
| 1,832,775 | Hallowell | Nov. 17, 1931 |
| 1,909,223 | Roos | May 16, 1933 |
| 1,911,916 | Menamin | May 30, 1933 |
| 1,928,527 | Fortinberry | Sept. 26, 1933 |
| 2,295,444 | Woodward | Sept. 8, 1942 |
| 2,338,968 | Robinson et al. | Jan. 11, 1944 |
| 2,380,916 | Beal | Aug. 7, 1945 |

FOREIGN PATENTS

| Number | Country | Date |
|---|---|---|
| 7,041 | Switzerland | July 31, 1893 |